(12) United States Patent
Hayes et al.

(10) Patent No.: US 8,379,572 B1
(45) Date of Patent: *Feb. 19, 2013

(54) METHOD AND SYSTEM FOR USE OF SHARED DATA TO GAIN WIRELESS PACKET DATA CONNECTIVITY

(75) Inventors: James M. Hayes, Gladstone, MO (US); Robert C. Lamb, Blue Springs, MO (US); Keith E. Moll, Overland Park, KS (US); Douglas A. Olding, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 705 days.

This patent is subject to a terminal disclaimer.

(21) Appl. No.: 12/562,606

(22) Filed: Sep. 18, 2009

Related U.S. Application Data

(63) Continuation of application No. 10/731,624, filed on Dec. 9, 2003, now Pat. No. 7,620,008, which is a continuation-in-part of application No. 10/660,957, filed on Sep. 12, 2003, now Pat. No. 7,305,090.

(51) Int. Cl.
*H04W 4/00* (2009.01)
*G03B 17/48* (2006.01)
(52) U.S. Cl. .................. 370/328; 370/395.52; 396/429; 380/249; 455/435.1; 455/556.1

(58) Field of Classification Search .................. 370/310, 370/328, 329, 395.52, 912, 913; 380/247, 380/249, 250; 455/435.1, 556.1; 396/429
See application file for complete search history.

(56) References Cited

U.S. PATENT DOCUMENTS

| | | | | |
|---|---|---|---|---|
| 5,335,265 | A * | 8/1994 | Cooper et al. | 455/410 |
| 5,887,249 | A * | 3/1999 | Schmid | 455/411 |
| 6,230,002 | B1 * | 5/2001 | Floden et al. | 455/411 |
| 6,628,934 | B2 * | 9/2003 | Rosenberg et al. | 455/411 |
| 6,915,132 | B2 * | 7/2005 | Chatterjee et al. | 455/435.1 |
| 7,305,354 | B2 * | 12/2007 | Rodriguez et al. | 705/26.41 |
| 2004/0157600 | A1 * | 8/2004 | Stumpert et al. | 455/432.1 |

* cited by examiner

*Primary Examiner* — Quochien B Vuong

(57) ABSTRACT

A method and system to allow wireless devices, such as wirelessly-equipped digital cameras, to gain wireless packet-data connectivity and to interact with a media management server, such as a photo server. A wireless carrier distributes multiple devices all having the same set of radio access data (e.g., mobile identification number and electronic serial number), and all having shared or unique pre-registration data. Any such device can then readily use the shared radio access data to acquire radio connectivity and can then use the pre-registration data to gain access to the media management server. The first time such a device connects with the media management server using the pre-registration data, the server will engage in a online account registration session with the device and provision the device with post-registration data that the device can thereafter use to access the online account.

21 Claims, 5 Drawing Sheets

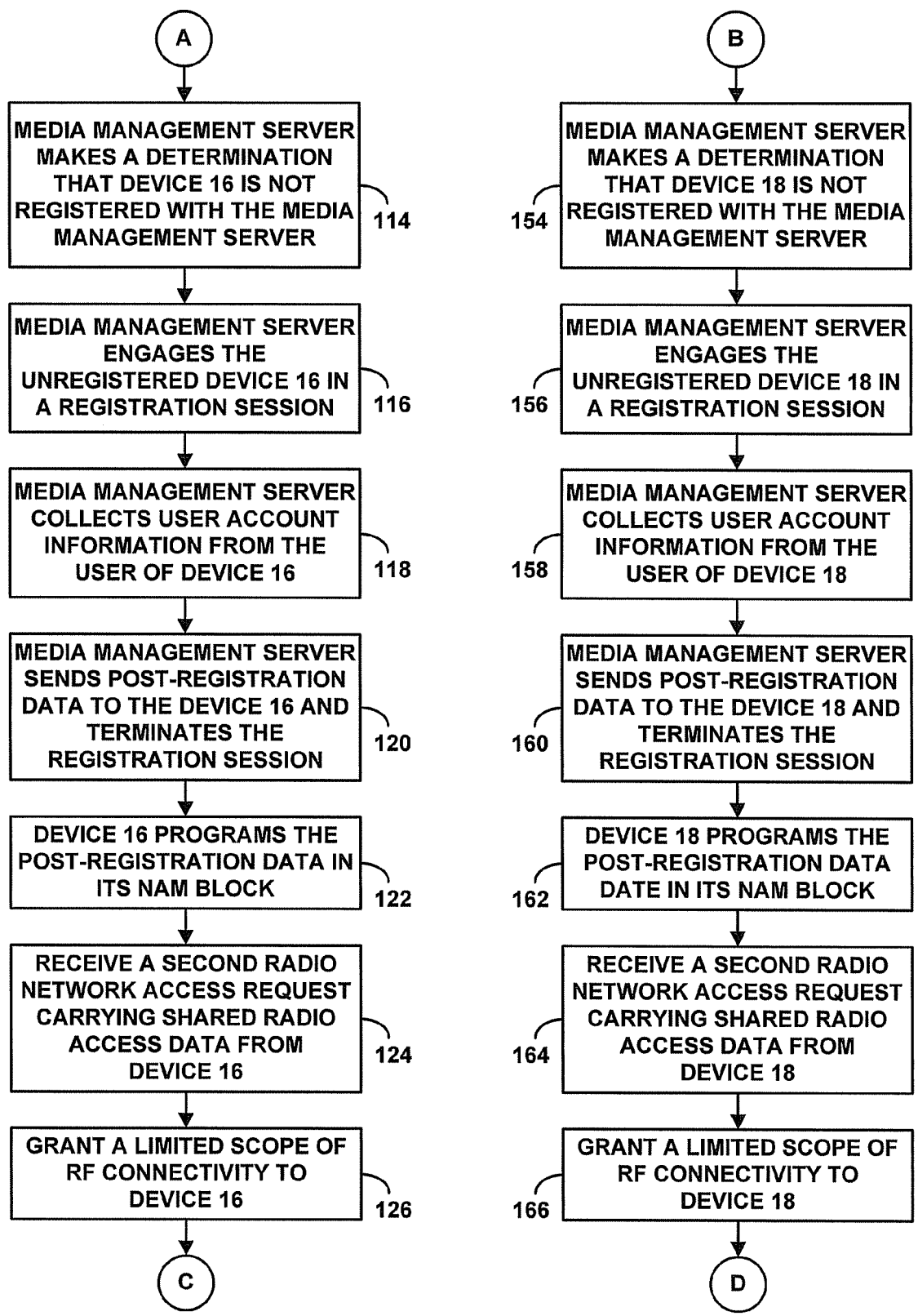

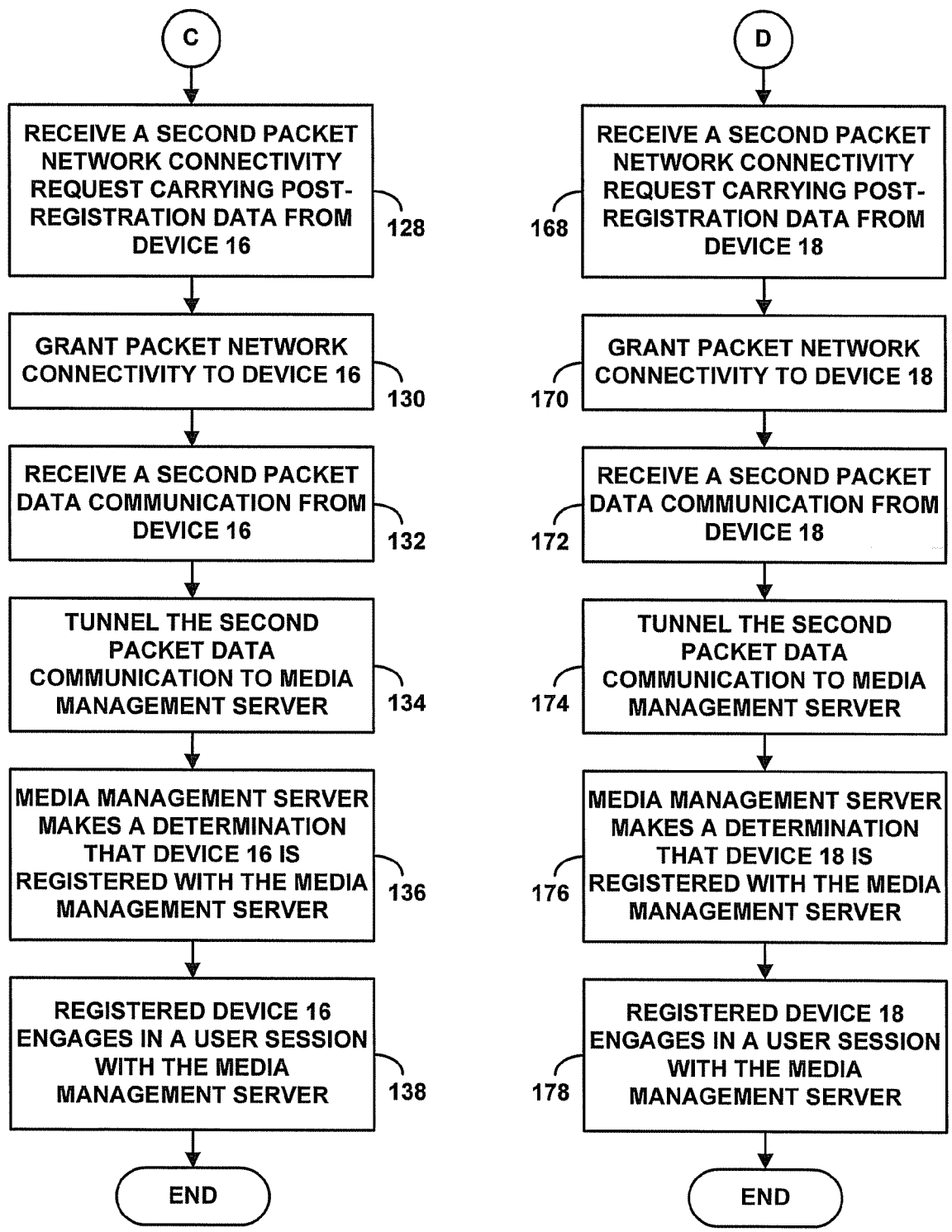

METHOD AND SYSTEM FOR USE OF SHARED DATA TO GAIN WIRELESS PACKET DATA CONNECTIVITY

REFERENCE TO RELATED APPLICATIONS

This is a continuation of U.S. patent application Ser. No. 10/731,624, filed Dec. 9, 2003, which is a continuation-in-part of U.S. patent application Ser. No. 10/660,957 filed on Sep. 12, 2003, now issued as U.S. Pat. No. 7,305,090. The entirety of each of these earlier applications is hereby incorporated by reference.

BACKGROUND

1. Field of the Invention

The present invention relates to wireless communications and, more particularly, to providing RF access and packet network access to wireless devices, such as wireless digital cameras, camera phones, personal digital assistants (PDAs), scanners, voice recorders, etc.

2. Description of Related Art a. Cellular Wireless Communications

Cellular wireless, like other forms of wireless communication, is an increasingly popular means of personal communication in the modern world. People are using cellular wireless networks for the exchange of voice and data over cellular telephones, PDAs, cellular telephone modems, camera-phones, and other devices. In principle, a user can communicate over the Internet or call anyone over the Public Switched Telephone Network (PSTN) from any place inside the coverage area of the cellular wireless network.

In a typical cellular wireless system, an area is divided geographically into a number of cell sites, each defined by a radio frequency (RF) radiation pattern from a respective base transceiver station (BTS) tower. Each BTS in a cell is in turn coupled with a base station controller (BSC). And the BSC is then coupled to or functionally integrated with a switch (e.g., a mobile switching center (MSC)) and/or gateway (e.g., a packet data serving node (PDSN)) that provides connectivity with a transport network such as the PSTN or a public or private IP network (e.g., the Internet).

When a wireless device, such as a cell phone, PDA or wirelessly-equipped personal computer, is positioned in a cell, the wireless device may communicate via an RF air interface with the BTS of the cell. A communication can thus be established between the wireless device and another entity on the transport network, via the air interface, the BTS, the BSC and the switch or gateway.

b. Acquisition of RF and Packet Network Connectivity

Traditionally, each wireless device in a cellular wireless system will have a unique Electronic Serial Number (ESN) and a unique Mobile Identification Number (MIN). The ESN, which is typically hard-coded into the device, identifies the device as a unique physical device and usually includes a manufacturer code and a manufacturer-assigned serial number. The MIN, on the other hand, is typically assigned to the device by a wireless carrier and can function as a subscriber ID. Further, each wireless device may be assigned a special authentication key (A-key), for use in validating its identity.

In typical practice, the MIN, ESN and A-key are used in combination to facilitate authentication of a wireless device when the wireless device seeks to gain access to a wireless carrier's RF resources. For instance, when a wireless device seeks to register in a wireless carrier's network or to initiate a communication via the network, the device may programmatically send into the carrier's network a message that carries (i) its MIN, (ii) its ESN and (iii) an "authentication result" that the device has computed as a predefined function of the MIN, the ESN, and its A-key, among other parameters. One or more entities in the carrier's network may then confirm that the MIN/ESN pair is not currently in use and compare the authentication result provided by the device with a network-computed authentication result, to authenticate the device. If the MIN/ESN pair is not currently in use and the authentication results match, the carrier may allow the device to access the RF network, i.e., to communicate via the RF network. Otherwise, the carrier may deny RF access.

In addition, a wireless device that is capable of engaging in packet-data communication (e.g., IP communication) may have a username and password that the device can use to gain packet network connectivity and to engage in packet-data communication. Typically, the username will be assigned by the wireless carrier and will be programmed into the wireless device. The username may take the form of a "network access identifier" (NAI), and the password may be a predefined hash based on the device's unique ESN.

When such a wireless device seeks to gain packet network connectivity, typically after the device first acquires RF connectivity, the device may programmatically send into the carrier's network a message that carries the device's username and password, among other information. An authentication server or other entity in the carrier's network may then validate the username/password (e.g., ensuring that the password is correct, and ensuring that the username is not already in use on the network) and, upon successful validation, may assign an IP address for the device to use. The device may then commence packet-data communication via the carrier's network.

c. Setting up a Wireless Device

Typically, when a user first acquires a wireless device, in order to use that device the user must first subscribe to service with a wireless carrier, and the wireless carrier will activate the user's wireless device for service. Usually, this involves assigning a MIN and A-key to the device, programming the device with the MIN and A-key, and recording the MIN and A-key in the carrier's network for use in authenticating and granting RF access to the device. Further, if the device is capable of engaging in packet-data communication, this may also involve assigning a username and password to the device, programming the device with the username and password, and recording the username and password in the carrier's network for use in authenticating and granting packet network access to the device.

This activation process can be carried out at the point of sale, such as at a retail store where the user buys the wireless device and subscribes to service. In that scenario, a sales technician may collect subscriber billing information such as name, address and credit card number, and establish an account for the device. The carrier may then assign a MIN, username and other activation data to the device and record that data in connection with the account, and the technician may program that data into the "Number Assignment Module" (NAM) block of the device for later use.

Alternatively, the activation process can be carried out over the air. In a conventional over-the-air service provisioning (OTASP) process, the user would call a customer service center, and a customer service representative would collect subscriber billing information. An entity in the carrier's network would then wirelessly request and receive from the device certain pre-configured parameters. In turn, an authentication server and the device may wirelessly communicate with each other to establish a common secure A-key and other data for use in authenticating the device. And an over-the-air function (OTAF) in the network may then wirelessly transmit other provisioning parameters, such as an assigned MIN and username for instance, to the device, which the device may then programmatically store in its NAM block for later use.

Typically, any wireless device that does not engage in voice communication but seeks to gain RF connectivity merely as a way to get onto a packet network has to be activated for service much the same way as a cell phone. Devices primarily used for packet-data communications thus have to have unique RF access data, subscribe to wireless service, and go through third-party activation to be able to use an RF network even if just for the purpose of getting onto a packet network.

Unfortunately, the above-described process of activating a wireless device requires a user to set up a cellular account with the carrier, and does not provide an efficient way to activate wireless devices used primarily for data communications. It would therefore be desirable to provide a more efficient activation mechanism for wireless devices not engaging in voice communications. Ultimately, it would be desirable to provide a better way for wireless devices engaging primarily in data communication to gain RF connectivity and to connect with and communicate over a packet network.

SUMMARY

The present invention provides a method and system for allowing wireless devices to easily gain wireless packet-data connectivity and to readily interact with a network server. The network server may take the form of a media management server, such as a photo-server for instance, and the wireless devices may be media devices such as wirelessly equipped digital cameras (e.g., cameraphones), personal digital assistants, scanners, voice recorders, or the like. With the benefit of the invention as will be described below, a user can acquire a wireless device and, without subscribing to cellular service, readily obtain RF connectivity and engage in packet-data communications with the network server.

In accordance with an exemplary embodiment of the invention, a wireless carrier will sell or otherwise distribute multiple wireless devices that come pre-configured with shared radio access data, such as a common MIN/ESN pair (or common MIN, ESN and A-key), and with pre-registration data, such as a special NAI (whether common or unique). The carrier's network will then be arranged to allow any device using the shared radio access data to gain radio connectivity. And the carrier's network will be arranged to allow any device using the pre-registration data to gain packet-data connectivity but to communicate only with the designated server.

The first time any such device gains wireless packet-data connectivity through the carrier's network and attempts to engage in packet-data communication, the carrier's network will thus tunnel the device to the designated server. At that point, because the device is using pre-registration data, the server will engage the device in a registration session, through which the server will collect user information (e.g., name, address and credit card information) and establish an online media account for the device/user. The server will then send to the device some post-registration data, which the device will store for later use in gaining packet-data connectivity and communicating with the server. The post-registration data, like the pre-registration data, may also be a special NAI, and the carrier's network will be arranged to allow any device using the post-registration data to gain packet-data connectivity but to communicate only with the designated server.

Each time the device thereafter gains wireless packet-data connectivity through the carrier's network and attempts to engage in packet-data communication using the post-registration data, the carrier's network will thus similarly tunnel the device to the designated server. But because the device is using the post-registration data, the server will know that the device already has an established media account and will therefore proceed to engage the device in a user-session, rather than a registration session. Through the user session, a user of the device can then access, update, or otherwise manage the established media account.

By way of example, a carrier or other associated entity may sell wirelessly equipped digital cameras through retail establishments. All of the digital cameras can come pre-configured with the same MIN/ESN pair, and the carrier's network will be set to allow any device using that MIN/ESN pair to gain radio connectivity but to engage only in packet-data communication. Further, all of the digital cameras can come pre-configured with a unique or shared pre-registration NAI, such as "device-serial-number@preregistration," where "device-serial-number" is a unique identifier of the device, and the carrier's network will be configured to allow any device using an NAI that ends in "@preregistration" to gain packet-data connectivity but to communicate only with a designated photo-server.

Any such camera could then readily gain RF connectivity using the shared MIN/ESN pair and then gain packet-data connectivity using the pre-registration NAI. When the device sends packet-data into the network, the carrier would then tunnel the packet-data to the photo server. In turn, the photo server may then seek to authenticate the device and would thereby detect that the device has a pre-registration NAI, which reflects that the device does not yet have an online photo storage account. Consequently, the photo server would automatically engage the device in a registration session so as to set up an online photo storage account for the device. And the photo server would provide the device with post-registration data, such as "device-serial-number@postregistration," for the device to use next time the device communicates with the photo server.

Thereafter, the device may again gain RF connectivity using the shared RF data, and the device may use the post-registration data to gain packet-data connectivity, which would cause the carrier's network to tunnel the device to the photo server. But when the device seeks to communicate with the photo server, the photo server will detect that the device is using the post-registration data rather than pre-registration data, and the photo server will therefore engage the device in a user session rather than a registration session. In an exemplary user session, the device may then upload or download photos or otherwise manage the online photo storage account.

Thus, in one respect, the exemplary embodiment may take the form of a method that includes (a) granting radio network access to a first wireless device operating under shared radio access data, (b) restricting the first wireless device to engage in packet-data communication with a media management server, (c) granting radio network access to a second wireless device operating under the same shared radio access data, and (d) restricting the second wireless device to engage in packet-data communication with the media management server.

In another respect, the exemplary method may involve, for each of a plurality of wireless devices, (a) granting radio network access to the wireless device operating under shared radio access data and then, in response to pre-registration data used by the wireless device, engaging in an over-the-air registration of the wireless device (i) to establish a user account for the wireless device with a media management server and (ii) to provision the wireless device with post-registration data.

In still another respect, the exemplary method may involve (a) distributing a plurality of wireless devices to users, where each wireless device includes shared radio access data that is the same on all of the wireless devices. In turn, the exemplary method may involve, for each such wireless device, (b) receiving into a network from the wireless devices a radio access request that carries the shared radio access data, and granting RF connectivity to the wireless device in response to at least the shared radio access data, (c) receiving into a media management server an access request from the wireless device and (i) if the access request carries pre-registration data, engaging in a registration session with the wireless device to set up a user account and to provision the wireless device with post-registration data and (ii) if the access request carries post-registration data, engaging in a user session with the wireless device.

In yet another respect, the exemplary embodiment may take the form of a system that includes (a) means for granting radio network access to multiple wireless devices operating under common radio access data, (b) means for granting packet network connectivity to each of the wireless devices, (c) means for tunneling each of the wireless devices to a network entity, (d) means for engaging in over-the-air registration of each of the wireless devices with the network entity and establishing for each wireless device a respective online account, and (e) means for granting each wireless device access to its respective online account.

And in yet another respect, the exemplary embodiment may take the form of a wirelessly-equipped digital camera that includes (a) a processor, (b) data storage, (c) a wireless communication interface and (d) a user interface. The data storage in such a camera would contain radio access data that includes a mobile identification number/electronic serial number (MIN/ESN) pair that is the same as a MIN/ESN pair stored as radio access data on at least one other wirelessly-equipped digital camera. And the data storage would further contain registration data that could be either (i) pre-registration data that the camera could use to gain access to and engage in a registration session with a media management system or (ii) post-registration data that the camera could use to gain access to and engage in a user session with the media management system.

Still further, the exemplary embodiment could take the form of a digital camera registration system. Such a system could include (a) a radio network access system that is arranged to grant radio network access concurrently to multiple digital cameras operating under a common mobile identification number (MIN)/electronic serial number (ESN) pair and (b) a photo management system that is arranged to engage in web communication with such a digital camera and to provision the digital camera with registration data for an online photo storage account.

These and other aspects and advantages will become apparent to those of ordinary skill in the art by reading the following detailed description, with reference where appropriate to the accompanying drawings. Further, it should be understood that the foregoing summary is merely exemplary and is not intended to limit the scope of the invention as claimed.

DETAILED DESCRIPTION OF AN EXEMPLARY EMBODIMENT

1. Exemplary Wireless Communication System

Figure 1:
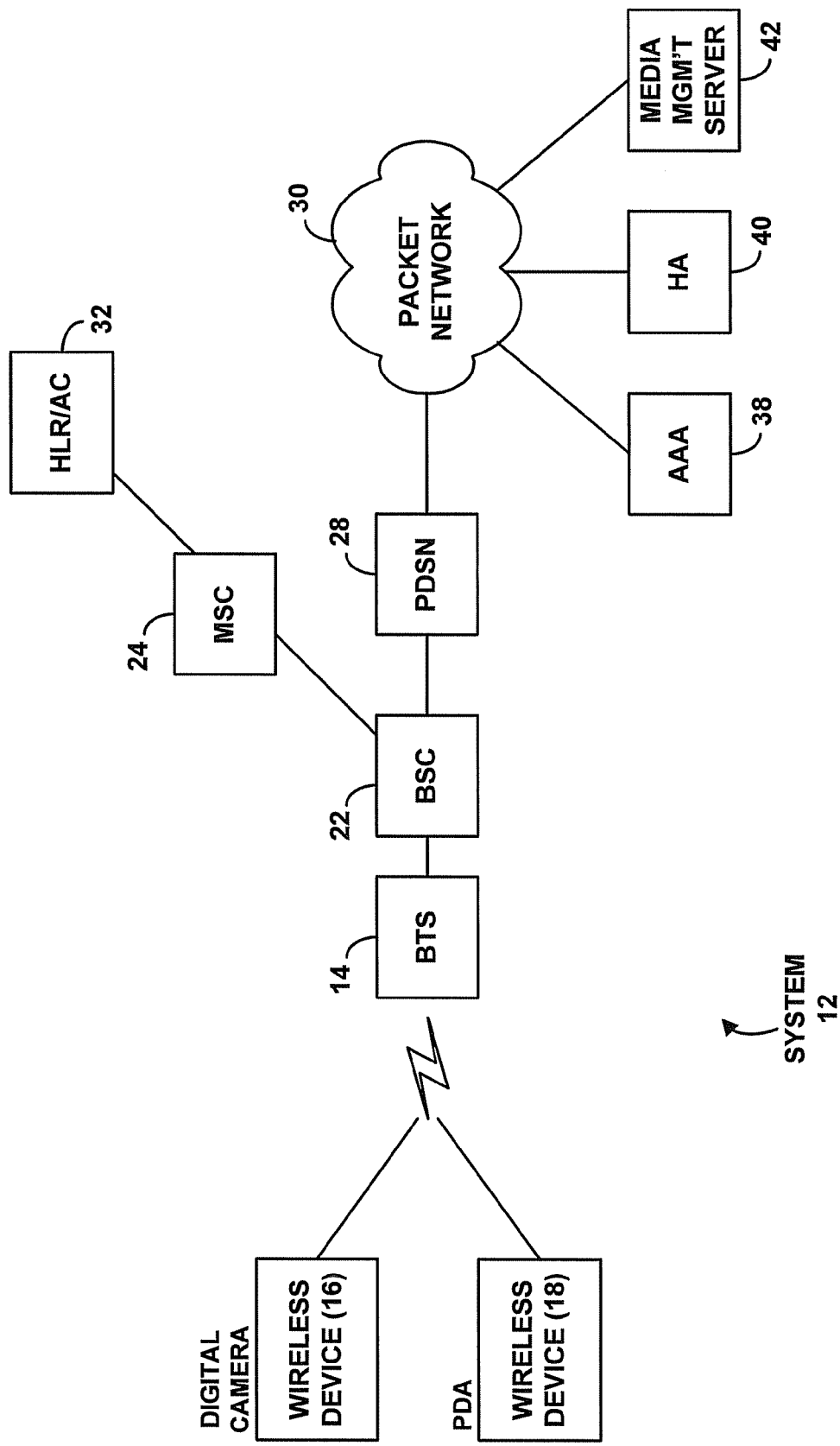
FIG. 1 is a simplified block diagram of a wireless communication system in which the exemplary embodiment can be carried out.

Referring to the drawings, FIG. 1 is a simplified block diagram of a typical wireless communication system 12 in which an exemplary embodiment of the invention can be carried out. It should be understood, however, that this and other arrangements shown and described herein are exemplary only, and that many variations are possible. For instance, various elements could be combined, distributed, added, or omitted. Further, it should be understood that entities described as carrying out various functions can be arranged to carry out those functions through software, firmware and/or hardware logic.

As generally illustrated in FIG. 1, the wireless communication system 12 includes a BTS 14 that radiates to provide an RF coverage area within which wireless devices can operate. The wireless devices can be fixed or mobile devices and can take various forms, examples of which include a wirelessly-equipped digital camera 16, a PDA 18, a camera phone, a scanner, or a voice recorder, among others. Although only two such devices are depicted in FIG. 1, system 12 could in theory support any number of wireless devices.

As further illustrated, BTS 14 is coupled with a BSC 22, which controls signaling over the RF air interface between the BTS and the wireless devices. In turn, BSC 22 is coupled with a PDSN or other gateway 28, which provides connectivity with a packet network 30, such as a wireless carrier's core packet network and/or the Internet. (Typically, the PDSN would connect with a carrier's core network, and the core network would connect via a firewall with the Internet.)

Conventionally, MSC 24, which monitors cellular calls, is coupled via a carrier's signaling network (not shown) with a home location register (HLR)/authentication center (AC) 32, as defined by well known industry standard ANSI-41. (The HLR/AC is just one example of a network authentication entity; other examples include the HLR itself and the AC itself.) In this regard, the MSC 24 and HLR/AC 32 would normally communicate with each other according to the messaging and procedures defined by ANSI-41 and other well known industry standards such as ANSI-771 for instance. However, the manner of communication could take other forms as well.

HLR/AC 32 and MSC 24 may work together to authenticate and admit wireless devices seeking to gain RF connectivity so as to be able to communicate via the carrier's system. For this purpose, HLR/AC 32 contains information that indicates radio access data, such as MIN, ESN, and A-key, for wireless devices authorized for service in the serving area covered by HLR/AC 32. The HLR/AC 32 and MSC 24 may be programmed to engage in a standard authentication process based on this access data when wireless devices seek to gain RF connectivity.

Further, the HLR/AC 32 (particularly, the HLR portion) would conventionally maintain or have access to a list of the MIN/ESN pairs or MIN/ESN/A-key sets that are authorized to gain RF connectivity. The HLR/AC 32 may then be programmed to check the MIN/ESN pair or the MIN/ESN/A-key set of any wireless device seeking to gain RF connectivity, so as to ensure that the pair or the set is valid. In accordance with the exemplary embodiment, the HLR/AC 32 may further be programmed to grant RF access to multiple devices using the same MIN/ESN pair or MIN/ESN/A-key set, and to limit the RF access of the wireless devices with such a pair or set to only packet-data communications, i.e., no circuit-switched phone-calls.

Thus, by way of example, when a wireless device seeks to register in the serving system of the MSC 24, the device would conventionally send an ANSI-41 Registration Request (REGREQ) message via an air interface access channel, and via the BTS 14 and BSC 22, to MSC 24. The Registration Request message would typically carry (i) the MIN/ESN pair or the MIN/ESN/A-key set, (ii) an authentication result (AUTHR) that the device computed using a predefined algorithm as a function of its MIN, ESN, A-key and perhaps other data, and (iii) one or more other parameters, such as a random number (RANDC) previously broadcast by the serving MSC 24.

Upon receipt of the Registration Request, the MSC 24 may pre-validate the wireless device by checking to ensure that the random number (RANDC) provided by the device is correct. In turn, the MSC 24 may send an ANSI-41 Authentication Request (AUTHREQ) message to the HLR/AC 32, providing the HLR/AC with the MIN, ESN, and A-key. The HLR/AC would then validate the MIN/ESN pair or the MIN/ESN/A-key set, to ensure that it is a valid pair or set. Further, the HLR/AC would compute its own AUTHR, applying the same predefined algorithm as a function of the MIN, ESN and the A-key that the HLR/AC has on record for the device and would send the AUTHR in an authreq return result message to the MSC. The MSC would then compare the HLR/AC-computed AUTHR with the device-computed AUTHR. If they match, then the MSC may grant the device RF access; otherwise, the MSC may deny the access request.

In addition, sitting on packet network 30 may conventionally be an authentication, authorization, and accounting (AAA) server 38 and a mobile-IP home agent (HA) 40. The AAA server 38 functions to authenticate a device that is seeking to gain packet network connectivity, (e.g., to acquire an IP address), and to keep records reflecting the extent of data communication per device, for billing purposes. As such, the AAA server would maintain or have access to registration data, such as pre-registration and post-registration NAI's, so that the AAA server could validate a device seeking to gain packet network connectivity. The home agent 40, in turn, conventionally functions to assign mobile-IP addresses and to manage mobility of devices across networks or sub-networks.

In typical practice, when a wireless device seeks to gain packet network connectivity, the device would send an ANSI-41 Origination Request (ORREQ) message via an air interface access channel, and via BTS 14 and BSC 22, to MSC 24. The Origination Request message would carry a "packet data" service option code, which signals to the MSC that the device is seeking to gain packet network connectivity rather than trying to place a conventional circuit-switched phone-call. In response to the packet-data service option code, the MSC would then signal to the BSC 22, and a packet-control-function (PCF) in the BSC would then signal to the PDSN 28 for further processing.

The PDSN 28 and the device would then engage in a standard negotiation to establish a data link layer connection, typically a point-to-point protocol (PPP) session over which packet-data can be exchanged between the wireless device and the PDSN. With that data link layer connection established, the wireless device would then conventionally send a mobile-IP Registration Request message to the PDSN, seeking to acquire a mobile-IP address to facilitate packet-data communication.

Conventionally, the PDSN would then send the Registration Request to the AAA server 38, which may validate the registration data, among other actions. The PDSN would then send the Registration Request message to the mobile-IP home agent 40, which would assign and send a mobile-IP address in a registration reply message to the PDSN. In turn, the PDSN would send the registration reply message to the wireless device, providing the mobile-IP address. And the wireless device may then commence IP communication using that mobile-IP address. For instance, the wireless device may then engage in a wireless web (e.g., HTTP) session or other IP-based communication with a remote data device such as a media management server 42 on packet network 30.

In accordance with the exemplary embodiment, the media management server 42 may function to maintain user accounts for devices served by the carrier or by another entity. In this regard, the media management server 42 may be arranged as a web server, so that it can communicate with a web browser on a wireless device. Further, the media management server 42 may be arranged to function as a conventional OTAF and program a wireless device with registration data, such as post-registration data. The media management server 42 is preferably located at a predefined address on the carrier's network, so that packet-data from a wireless device is always directed to the media management server.

2. Exemplary Wireless Devices

In accordance with the exemplary embodiment, a wireless carrier will distribute multiple wireless devices, and each device will come pre-configured with (i) radio access data and (ii) pre-registration data. Optimally, the radio access data on each device will include generic authentication data such as a shared MIN/ESN pair or a MIN/ESN/A-key set that is the same on all of the devices.

Figure 2:
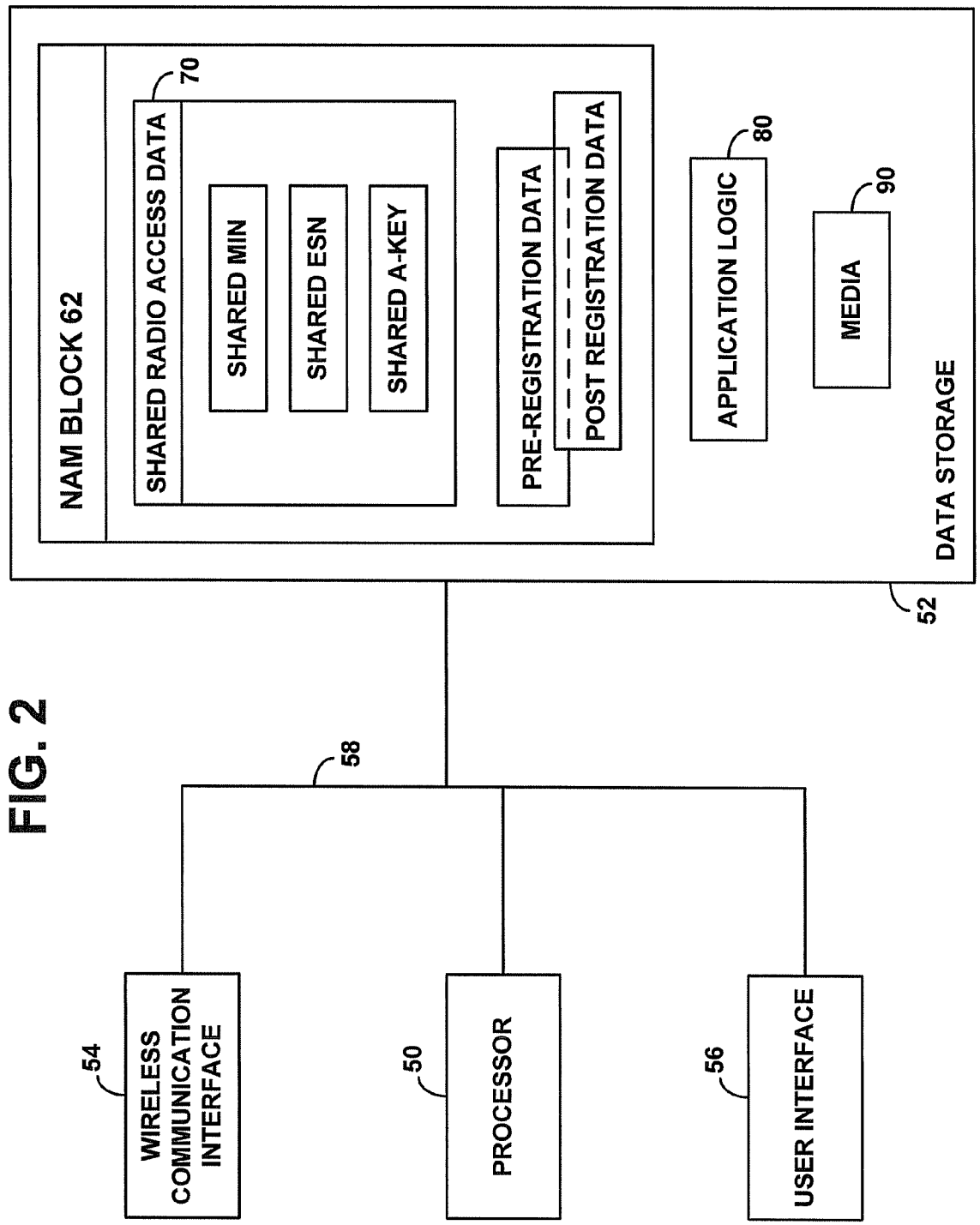
FIG. 2 is a functional block diagram of a wireless device arranged to operated in accordance with the exemplary embodiment.

FIG. 2 is a functional block diagram of an exemplary wireless device, which could be how each of devices 16, 18 (the camera and PDA) may appear when the carrier first distributes them to users. Each device 16, 18 includes a processor 50, data storage 52, a wireless communication interface 54, and a user interface 56, all of which may be tied together by a system bus or other mechanism 58.

The processor 50 may comprise one or more general purpose microprocessors and/or dedicated signal processors. (The term "processor" encompasses either a single processor or multiple processors.) The data storage 52, in turn, may comprise volatile memory, non-volatile memory (e.g., Flash ROM or storage drive), and/or other sorts of storage space and could be integrated in whole or in part with processor 50. Wireless communication interface 54 may include an antenna and a standard chipset for engaging in wireless communication according to an accepted protocol such as CDMA, TDMA, or GSM, for instance, or according to another specified protocol. User interface 56 may then include input and output mechanisms, such as a keypad and a display, for instance, to facilitate interaction with a user.

The data storage 52 in each device may define a NAM block 62, which serves to hold the shared radio access data 70 and the registration data. In this regard, when the device is first distributed to the user and before the device has been registered with a media management server (i.e., before it has been tied to a user account and programmed with post-registration data), its NAM block 62 will contain the shared radio access data, such as the shared MIN/ESN pair or the MIN/

ESN/A-key set, and the pre-registration data. The device will then use the shared radio access data to gain RF connectivity, and the pre-registration data as a basis to gain packet-data connectivity. Further, the device may use the pre-registration data to gain access to the media management server and to engage in a registration session through which the device would acquire post-registration data. The device would then store the post-registration data in data storage 52 in place of (or in addition to) the pre-registration data.

In addition, the data storage 52 in each device 16, 18, will preferably include a set of application logic 80 that is executable by the processor 50 to carry out various functions described herein. For example, the application logic 80 may be arranged to use the device's shared radio access data 70 to gain RF connectivity and to then use the registration data to gain and packet network connectivity and to communicate with media management server 42, in response to a user request for instance.

In particular, in response to a user's request to start the data session, the application logic 80 may cause the device to send to MSC 24 a Registration Request message that carries the shared MIN/ESN pair or the MIN/ESN/A-key set, so as to then gain limited RF connectivity as described above. In turn, the application logic may work to originate a PPP session with the PDSN 28 and send a mobile-IP Registration Request message that carries its registration data, so as to then gain packet network connectivity as described above. In this regard, the application logic 80 may be arranged to autonomously initiate the data session, or the application logic 80 may prompt the user to initiate the session. For instance, in response to the user's request to start the data session, the application logic 80 could present the user with a screen display that asks the user to press a soft key or other mechanism to cause the device to initiate a data session with the media management server.

Once the device has acquired packet network connectivity, the application logic 80 may then send a web request or other data message to the predefined network address of the media management server 42, so as to commence a registration or a user session. To accomplish this, the wireless device can be pre-programmed with the network address of the media management server. Alternatively, the network can be arranged to tunnel any attempted packet-data communications to the media management server, regardless of what address the device uses.

Preferably, the web request will carry the device's registration data, and the type of session that the request invokes will depend on the type of registration data. If the registration data is pre-registration data, then the media management server may treat the request as a request to invoke a registration session. Whereas, if the registration data is post-registration data, then the media management server may treat the request as a request to invoke a user session. (Note that, if the device has both pre-registration data and post-registration data stored in data storage 52, the device will preferably use its post-registration data when seeking to gain access to the media management server.)

To facilitate web communication with the media management server, the application logic 80 will also preferably define a web browser application (such as Openwave Mobile Browser™ or Microsoft Internet Explorer™, for instance). Through use of the browser, the device and user may engage in a registration session with the media management server 42, through which the server may prompt the user to provide name, address and credit card information, and through which the server may send post-registration data to the device. (In this regard, the application logic 80 may be arranged to detect post-registration data provided by a web communication from the media management server (e.g., as indicated by markup language in the communication) and to responsively store the post-registration data in data storage 52.) Further, through use of the browser, the device and user may engage in a user session with the media management server, through which the user can upload and download media and otherwise manage the established user account.

3. Exemplary Radio Access Data

In the exemplary embodiment, the shared MIN, ESN and A-key stored on each device as radio access data preferably take the same form as normal MINs, ESNs and A-keys, so that the network can handle them as the network normally handles MINs, ESNs and A-keys. However, the shared MIN, ESN and A-key will have designated values that the network will recognize as the shared radio access data. For instance, if a MIN is normally a 10 digit number, the MIN on each device might be a specially designated 10-digit number, such as 000-111-0000, that the network will recognize as a shared radio access MIN. Similarly, if an ESN is normally a 32-bit serial number, the ESN on each device might be a specially designated 32-bit pattern that the network will recognize as a shared radio access ESN.

Note also that the shared radio access data could take other forms. For instance, rather than or in addition to comprising a MIN, the shared radio access data could comprise some other identifier, such as a mobile directory number (MDN) or mobile station identifier (MSID). Other examples are possible as well.

4. Exemplary Registration Data

In the exemplary embodiment, the registration data can serve two purposes: (1) to facilitate acquisition of packet network connectivity and (2) to gain access to the media management server so as to invoke a registration or user session. Note that in an alternative embodiment, however, different data can be used for these two purposes.

The registration data can take various forms. In a preferred embodiment, for instance, it can take the form of an NAI (as defined by well known RFC 2486), which has a username portion and a realm portion. The username portion of the registration data may be unique per device, such as the device's serial number, so that the media management server can determine which device is communicating. The realm portion of the registration data may, however, be a shared identifier such as "preregistration," "postregistration" or "mediamanagement," common to multiple devices. Thus, by way of example, pre-registration data may take the form "device-serial-number@preregistration" and post-registration may take the form "device-serial-number@postregistration."

Note that having a unique username portion is particularly useful with post-registration data, in that it allows the media management server to correlate the post-registration data with an already-established user-account. On the other hand, having a unique username portion may or may not be useful with pre-registration data. In one respect, it would be useful to have a unique username portion in pre-registration data, so that the media management server can determine which device is seeking to establish a user account, and so that the media management server can then correlate that device with the account. However, the pre-registration data could just as well be entirely shared, i.e., all devices could have exactly the same pre-registration data (e.g., "genericvalue@pre-registration." just for purposes of gaining access to the media management server initially.

In the exemplary embodiment, the first time a device requests packet network connectivity and engages in a registration session with a media management server, the device will use the pre-registration data that is pre-configured in the device. After registering with the server and acquiring post-registration data, the device will then use the post-registration data as the basis to gain packet network connectivity and to access the established account.

In this regard, for a given device, the username portion of the post-registration data may or may not be the same as the username portion of the pre-registration identifier. For instance, it may remain the device's serial number or other value. Alternatively, the username portion of the post-registration data could be a username selected during the registration process.

Further, the realm portion of the post-registration data may or may not be the same as the realm portion of the pre-registration data. For instance, as noted above, the realm portion of pre-registration data could be "preregistration" and the realm portion of post-registration data could be "postregistration." Alternatively, the realm portions of both pre-registration and post-registration data could be the same, such as "mediamanagement" for instance.

In the exemplary embodiment, the media management server will determine based on the registration data used by a given device whether the device is to engage in a registration session or a user session. For instance, if device 16 accesses the media management server with registration data "device16-serial-number@preregistration," the media management server can readily conclude that the device needs to register. Therefore, the server may engage in a registration session with the device. On the other hand, if device thereafter accesses the media management server with the registration data "device16-serial-number@postregistration," the media management server can readily conclude that the device is already registered and can use the registration data as a basis to look up the account for the device and to then engage in a user session.

Once a device engages in a registration session and acquires post-registration data, the device will save the post-registration data in its NAM block for later use. In this regard, the device may save the post-registration data in place of the pre-registration data or in addition to the pre-registration data. If the post-registration data is saved alongside the pre-registration data, the device may be programmed to disable the pre-registration data and prevent it from being sent to the server in future communications between the device and the server.

5. Exemplary Network Arrangement

Optimally, the wireless carrier's network will recognize that a device seeking to gain RF connectivity is using shared radio access data to do so, and the network will allow the device to gain RF connectivity but will restrict the device to engaging in packet-data communications with the media management server and thus preclude the device from placing circuit-switched phone calls or engaging other sorts of packet-data communications. That way, a rogue user could not use the device to place phone calls or to engage in data communications other than with the media management server.

In order to accomplish this in the exemplary embodiment, several elements in the network may be modified through suitable programming logic or the like.

First, the HLR/AC 32 will preferably be set to authenticate any wireless device that seeks to gain RF connectivity using at least the shared MIN/ESN pair (and perhaps the shared A-key). In this regard, the HLR/AC 32 can be flagged to allow multiple devices to concurrently register in the network with the same MIN/ESN pair or the same MIN/ESN/A-key set, namely, the shared radio access data. (This can be as simple as setting a Boolean indication in connection with the MIN/ESN pair or the MIN/ESN/A-key set, in the list of radio access data maintained by the HLR/AC.) The HLR/AC might also be set to compute an authentication result based on the shared radio access data and to send that authentication result to the MSC 24 so that it will match an authentication result computed by the device seeking access. Alternatively, the HLR/AC can be set to forego computation of an authentication result and to simply send a positive "authreq" return result to the MSC 24 whenever the MIN/ESN pair or MIN/ESN/A-key set of the device seeking access is the shared MIN/ESN pair or MIN/ESN/A-key set.

Second, the MSC 24 will preferably be set to block anything but packet-data origination requests coming from a wireless device that is operating under the shared radio access data. In this regard, when a wireless device seeks to originate a communication the device normally sends to the MSC an Origination Request message that carries its MIN and ESN, and perhaps it's A-key. It is known for a switch to be able to route or block call attempts based on the incoming request. In this instance, the MSC can thus be readily programmed to allow only data origination requests and disallow circuit-switched phone-call requests from a device with the shared MIN/ESN pair of the MIN/ESN/A-key set.

Third, the AAA server 38 will preferably be set to authenticate any wireless device that uses the registration data described above to gain packet network connectivity. The AAA server could be set to simply validate the device (sending a positive response to the PDSN) when the AAA server sees that the device is operating under the registration data.

Fourth, the PDSN 28 may be set to tunnel to the media management server 42 any and all data traffic that comes from a wireless device operating under the registration data, so as to preclude such a wireless device from engaging in packet-data communication with other entities on network 30. In this regard, when the device first acquires an IP address, the PDSN could flag the IP address as one assigned to a device operating under the registration data, and then, when the PDSN receives packet-data originating from that IP address, the PDSN would route the packet data to the media management server 44, regardless of what destination IP address is indicated in the data. Alternatively, the PDSN could be arranged to examine individual packets or packet streams at the application layer so as to determine whether the packets originate from a device operating under the registration data.

Further, the media management server 44 will preferably be programmed to receive an HTTP request or other sort of web request from a wireless device. The HTTP request would carry the registration data in an HTTP header, and so the media management server could simply read that registration data from the header. The media management server may then respond accordingly.

If the HTTP request carries pre-registration data, then the media management server may provide an HTTP response that defines a prompt to determine whether a user of the device would like to establish an online media account. In turn, if the user so desires, the device and media management server may engage in further dialog to establish the account, and the media management server may deliver post-registration data to the device. For instance, the media management server could send the post-registration data to the device in a predefined XML format within an HTTP response message, to be read and stored by the device in the device's NAM block. The media management server may use conventional OTASP techniques for sending such information to the device.

If, on the other hand, the HTTP request carries post-registration data, then the media management server may use the post-registration data to authenticate the device (possibly validating a password with the data) and to look up an established account. In turn, the media management server may then engage in a user session with the device.

6. Exemplary Process Flow

Figure 3:
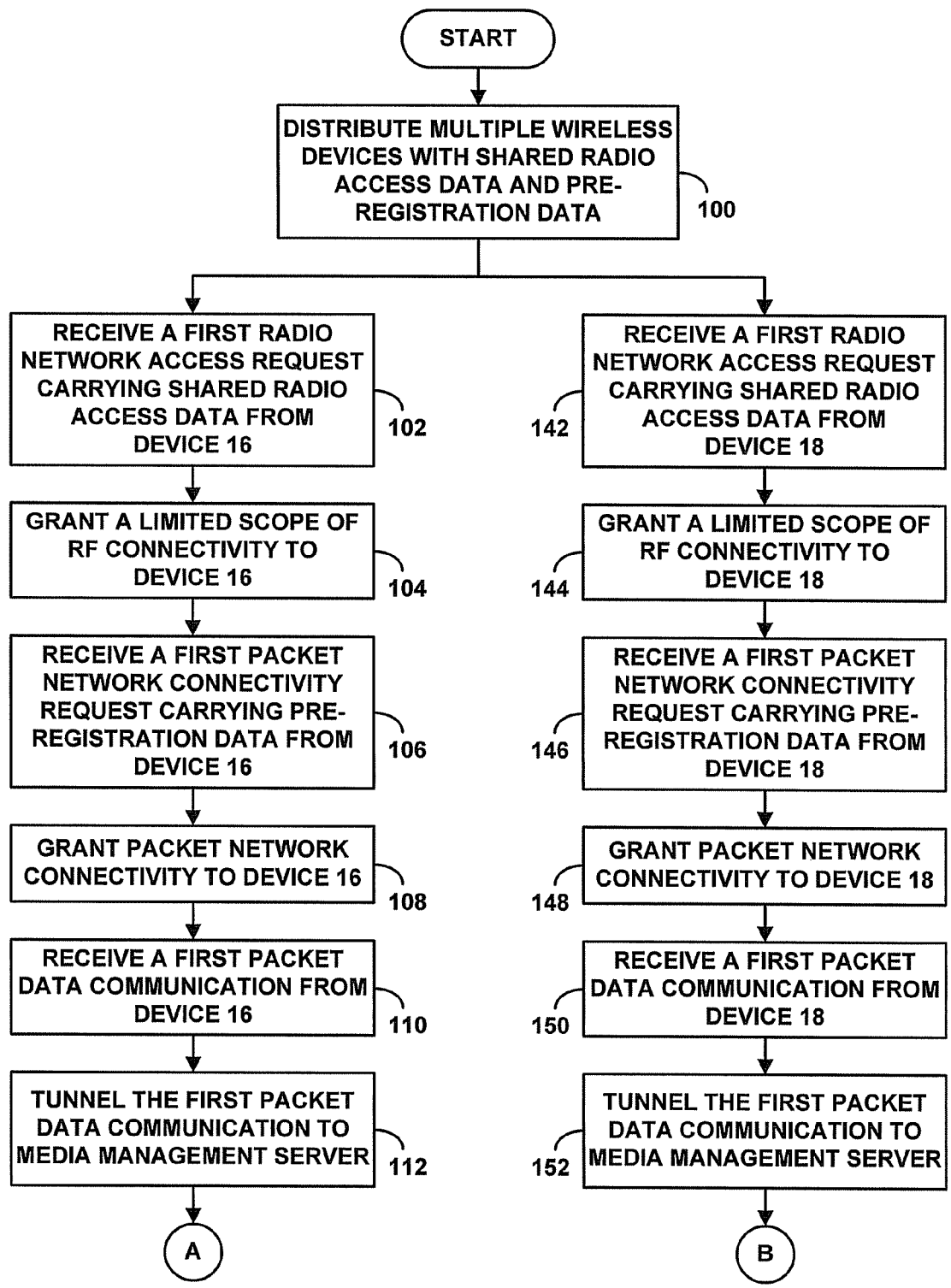
FIG. 3 is a flow chart, depicting functions that can be carried out in accordance with the exemplary embodiment.

Referring to FIG. 3, a flow chart is provided to help illustrate some of the functions that can be carried out in accordance with the exemplary embodiment. As shown in FIG. 3, at block 100, a wireless carrier distributes multiple wireless devices, including device 16 and device 18 for instance. Each device preferably includes stored shared radio access data and pre-registration data as described above. Multiple devices may then operate concurrently to gain radio connectivity and packet-data connectivity.

At block 102, for instance, the carrier may receive into its network from a device 16 a radio network access request that carries the shared radio access data. And at block 104, the carrier may then grant limited RF connectivity to device 16 in response to the shared radio access data. At block 106, the carrier may then receive into the network from device 16 a packet network connectivity request that carries pre-registration data. And at block 108, the carrier may grant packet network connectivity to device 16 in response to that pre-registration data.

At block 110, the carrier may then receive into the network from device 16 a packet-data communication, such as an HTTP request, that carries the pre-registration data. And at block 112, the carrier may tunnel the packet-data communication to a media management server. At block 114, based on the pre-registration data in the HTTP request, the media management server may make a determination that device 16 is not registered with the media server. Therefore, at block 116 the media management server may engage the unregistered device 16 in a registration session. At block 118, by prompting the user of a device to enter user account information, the media management server may collect user account information from the user of the device.

At block 120, the media management server may then process the entered information and perhaps other data, such as the data in the packet data communication, and produce post-registration data, which the server then sends to the device. In turn, at block 122, the device may programmatically store the post-registration data in its NAM block.

Thereafter, the user of the device can engage in a user session. For instance, at block 124, the carrier may receive a second radio access request carrying the same shared radio access data. And at block 126, the carrier may grant a limited scope of RF connectivity. In turn, at block 128 the carrier may receive from the device a second packet network connectivity request, but the request will carry the post-registration data. At block 130 the carrier may then grant packet network connectivity to the device 16.

At block 132, the carrier may then receive a second packet data communication from the device and, at block 134, the carrier may tunnel the second packet data communication to the media management server. At block 136, based on the post-registration data in the HTTP request, the media management server may then make a determination that device 16 is already registered with the media management server, and, at block 138, the media management server may engage device 16 in a user session.

At the same time, or at some other time, the carrier may also receive into its network from a device 18 a radio network access request that carries the shared radio access data, as shown at block 142. And at block 144, the carrier may then grant limited RF connectivity to device 18 in response to the shared radio access data. At block 146, the carrier may then receive into the network from device 18 a packet network connectivity request that carries pre-registration data. And at block 148, the carrier may grant packet network connectivity to device 18 in response to that pre-registration data.

At block 150, the carrier may then receive into the network from device 18 a packet-data communication, such as an HTTP request, that carries the pre-registration data. And at block 152, the carrier may tunnel the packet-data communication to a media management server. At block 154, based on the pre-registration data in the HTTP request, the media management server may make a determination that device 18 is not registered with the media server. Therefore, at block 156, the media management server may engage the unregistered device 18 in a registration session. At block 158, by prompting the user of a device to enter user account information, the media management server may collect user account information from the user of the device.

At block 160, the media management server may then process the entered information and perhaps other data, such as the data in the packet data communication, and produce post-registration data, which the server then sends to the device. In turn, at block 162, the device may programmatically store the post-registration data in its NAM block.

Thereafter, the user of the device can engage in a user session. For instance, at block 164, the carrier may receive a second radio access request carrying the same shared radio access data. And at block 166, the carrier may grant a limited scope of RF connectivity. In turn, at block 168, the carrier may receive from the device a second packet network connectivity request, but the request will carry the post-registration data. At block 170, the carrier may then grant packet network connectivity to the device 18.

At block 172, the carrier may then receive a second packet data communication from the device and, at block 174, the carrier may tunnel the second packet data communication to the media management server. At block 176, based on the post-registration data in the HTTP request, the media management server may then make a determination that device 18 is already registered with the media management server, and, at block 178, the media management server may engage device 18 in a user session.

7. Multiple-Server Variation

As a variation from the arrangement described above, separate servers or platforms could be provided to handle the registration and media management processes. When a device uses pre-registration data, a PDSN or other entity may tunnel communications from the device to a registration server, and the registration server could then engage in a registration session with the device/user, so as to set up a media management account and provide the device with post-registration data. In turn, when the device then uses the post-registration data, the PDSN or other entity may tunnel communications from the device to a media management server to allow a user of the device to engage in a user session.

Further, during the registration session, the registration server could provide the device with an IP address or URL of an applicable media management server, which the device can store for later use. Thereafter, when the device seeks to interact with the media management server, the device may send a communication to the designated IP address or URL. A benefit of this arrangement may be to allow for distributed media management servers. For instance, a carrier could provide separate media management servers to serve different areas of the country. When a user from a given area of the country registers, the user's device could then receive an IP address or URL of the applicable media management server.

8. Conclusion

An exemplary embodiment of the present invention has been described above. Those skilled in the art will understand, however, that changes and modifications may be made to this embodiment without departing from the true scope and spirit of the present invention, which is defined by the claims.

We claim:

1. A method comprising:
   granting radio network access to a first wireless device operating under shared radio access data, wherein the shared radio access data comprises a shared mobile identification number-electronic serial number (MIN-ESN) pair;
   restricting the first wireless device to engage in packet-data communication with a network entity;
   granting radio network access to a second wireless device operating under the same shared radio access data; and
   restricting the second wireless device to engage in packet-data communication with the network entity,
   wherein a network authentication entity is set to allow multiple wireless devices to operate concurrently under the same shared radio access data, wherein granting radio access to the first wireless device operating under the shared radio access data comprises the network authentication entity authenticating the first wireless device based the shared radio access data, and wherein granting radio access to the second wireless device operating under the shared radio access data comprises the network authentication entity authenticating the second wireless device based on the shared radio access data.

2. The method of claim 1, wherein the network entity comprises a media management server.

3. The method of claim 2, wherein the media management server comprises a photo server.

4. The method of claim 2, wherein the first wireless device is a wirelessly-equipped digital camera, and the second wireless device is a wirelessly-equipped digital camera.

5. The method of claim 1,
   wherein the network entity comprises a registration server,
   wherein restricting the first wireless device to engage in packet-data communication with the network entity comprises (i) detecting that the first wireless device is using pre-registration data and (ii) responsive to detecting that the first wireless device is using pre-registration data, tunneling a communication from the first wireless device to the network entity, and
   wherein restricting the second wireless device to engage in packet-data communication with the network entity comprises (i) detecting that the second wireless device is using pre-registration data and (ii) responsive to detecting that the second wireless device is using pre-registration data, tunneling a communication from the second wireless device to the network entity.

6. A method comprising:
   granting radio network access to a first wireless device operating under shared radio access data and then, in response to first pre-registration data used by the first wireless device, engaging in a first over-the-air registration of the first wireless device (i) to establish a first user account for the first wireless device with a media management server and (ii) to provision the first wireless device with first post-registration data;
   granting radio network access to a second wireless device operating under the same shared radio access data and then, in response to second pre-registration data used by the second wireless device, engaging in a second over-the-air registration of the second wireless device (i) to establish a second user account for the second wireless device with the media management server and (ii) to provision the second wireless device with second post-registration data different than the first post-registration data,
   wherein the shared radio access data comprises a shared mobile identification number-electronic serial number (MIN-ESN) pair,
   wherein a network authentication entity is set to allow multiple wireless devices to operate concurrently under the same shared radio access data, wherein granting radio access to the first wireless device operating under the shared radio access data comprises the network authentication entity authenticating the first wireless device based on the shared radio access data, and wherein granting radio access to the second wireless device operating under the shared radio access data comprises the network authentication entity authenticating the second wireless device based on the shared radio access data.

7. The method of claim 6, further comprising:
   restricting the first wireless device to engage in packet-data communications with the media management server; and
   restricting the second wireless device to engage in packet-data communications with the media management server.

8. The method of claim 6, wherein the first pre-registration data comprises a first unique pre-registration identifier and a shared pre-registration identifier, and wherein the second pre-registration data comprises a second unique pre-registration identifier and the shared pre-registration identifier.

9. The method of claim 6, wherein the first post-registration data comprises a first unique post-registration identifier and a shared post-registration identifier, and wherein the second post-registration data comprises a second unique post-registration identifier and the shared post-registration identifier.

10. The method of claim 6,
    wherein engaging in the first over-the-air registration comprises sending and receiving web communications between the media management server and the first wireless device, collecting user information for the first user account, and sending the first post-registration data to the first wireless device; and
    wherein engaging in the second over-the-air registration comprises sending and receiving web communications between the media management server and the second wireless device, collecting user information for the second user account, and sending the second post-registration data to the first wireless device.

11. The method of claim 6, further comprising:
after provisioning the first wireless device with the first post-registration data, the media management server allowing the first wireless device to use the first post-registration data in gaining access the first user account; and
after provisioning the second wireless device with the second post-registration data, the media management server allowing the second wireless device to use the second post-registration data in gaining access the second user account.

12. The method of claim 6,
wherein the first wireless device comprises a wirelessly-equipped digital camera, and
wherein the second wireless device comprises a wirelessly-equipped digital camera.

13. A system comprising:
means for granting radio network access to multiple wireless devices operating under common radio access data, wherein the common radio access data comprises a common mobile identification number-electronic serial number (MIN-ESN) pair;
means for granting packet network connectivity to each of the wireless devices;
means for tunneling each of the wireless devices to a network entity;
means for engaging in over-the-air registration of each of the wireless devices with the network entity and establishing for each wireless device a respective online account;
means for granting each wireless device access to its respective online account,
wherein the means for granting radio network access to the multiple wireless devices operating under common radio access data comprises a network authentication entity set to allow wireless devices to operate concurrently under the common radio access data.

14. The system of claim 13, further comprising means for restricting the wireless devices to engage in packet-data communications.

15. The system of claim 13, wherein the network entity comprises a media management server.

16. The system of claim 13, wherein the wireless devices comprise wirelessly-equipped digital cameras.

17. The system of claim 13, wherein the means for engaging in over-the-air registration of the multiple wireless devices with a network entity comprises means for sending and receiving communications between the network entity and the wireless devices, collecting user data, and sending post-registration data to the wireless devices.

18. A method comprising:
distributing a plurality of wireless devices to users, wherein each wireless device includes shared radio access data that is the same on all of the wireless devices, wherein the shared radio access data comprises a common mobile identification number and a common electronic serial number;
operating a network authentication entity that is set to allow multiple wireless devices to operate concurrently under the shared radio access data;
receiving into a network from a first of the wireless devices a first radio access request that carries the shared radio access data, authenticating the first wireless device at the network authentication entity based at least on the shared radio access data carried by the first radio access request, and granting radio frequency (RF) connectivity to the first wireless device in response to at least the authenticating of the first wireless device;
receiving into a media management server a first access request from the first wireless device and (i) if the first access request carries pre-registration data, engaging in a registration session with the first wireless device to set up a first user account and to provision the first wireless device with post-registration data and (ii) if the first access request carries post-registration data, engaging in a user session with the first wireless device;
receiving into a network from a second of the wireless devices a second radio access request that carries the shared radio access data, authenticating the second wireless device at the network authentication entity based at least on the shared radio access data carried by the second radio access request, and granting RF connectivity to the second wireless device in response to at least the authenticating of the second wireless device; and
receiving into a media management server a second access request from the second wireless device and (i) if the second access request carries pre-registration data, engaging in a registration session with the second wireless device to set up a second user account and to provision the second wireless device with post-registration data and (ii) if the second access request carries post-registration data, engaging in a user session with the second wireless device.

19. The method of claim 18, wherein the shared radio access data further comprises a common authentication-key (A-key).

20. The method of claim 18, wherein each of the first and second wireless devices comprises a wirelessly-equipped digital camera.

21. The method of claim 18, wherein distributing the plurality of wireless devices comprises selling the plurality of wireless devices.

* * * * *